United States Patent [19]

Malara

[11] Patent Number: 5,042,317

[45] Date of Patent: Aug. 27, 1991

[54] SAFETY DEVICE IN THE CONTROL OF A MOTOR VEHICLE AUTOMATIC TRANSMISSION

[75] Inventor: Nicola Malara, Cusano Milanino, Italy

[73] Assignee: Alfa Lancia S.p.A., Arese, Italy

[21] Appl. No.: 528,480

[22] Filed: May 25, 1990

[30] Foreign Application Priority Data

May 29, 1989 [IT] Italy .................. 20672 A/89

[51] Int. Cl.⁵ .............................................. G05G 5/06
[52] U.S. Cl. ..................................... 74/529; 192/4 A
[58] Field of Search ..................... 74/529, 526, 501.6, 74/533, 535, 536, 537, 538, 475; 192/4 A

[56] References Cited

U.S. PATENT DOCUMENTS

| | | | |
|---|---|---|---|
| 3,023,634 | 3/1962 | Tozza | 74/526 |
| 4,096,930 | 6/1978 | Viscardi | 192/4 A |
| 4,649,769 | 3/1987 | Venable | 74/526 X |
| 4,917,224 | 4/1990 | Gokee | 192/4 A |
| 4,919,242 | 4/1990 | Muramatsu et al. | 192/4 A |
| 4,947,967 | 8/1990 | Kito et al. | 192/4 A |

FOREIGN PATENT DOCUMENTS 315174 5/1989 European Pat. Off. .

Primary Examiner—Rodney M. Lindsey
Attorney, Agent, or Firm—Charles A. Brown

[57] ABSTRACT

A safety device in the control of a motor vehicle automatic transmission, wherein the gear selector lever is provided with a mechanical locking device which is operated by a cable connected to the brake pedal and locks the lever in predetermined positions, from which it can be released only by pressing the brake pedal.

4 Claims, 2 Drawing Sheets

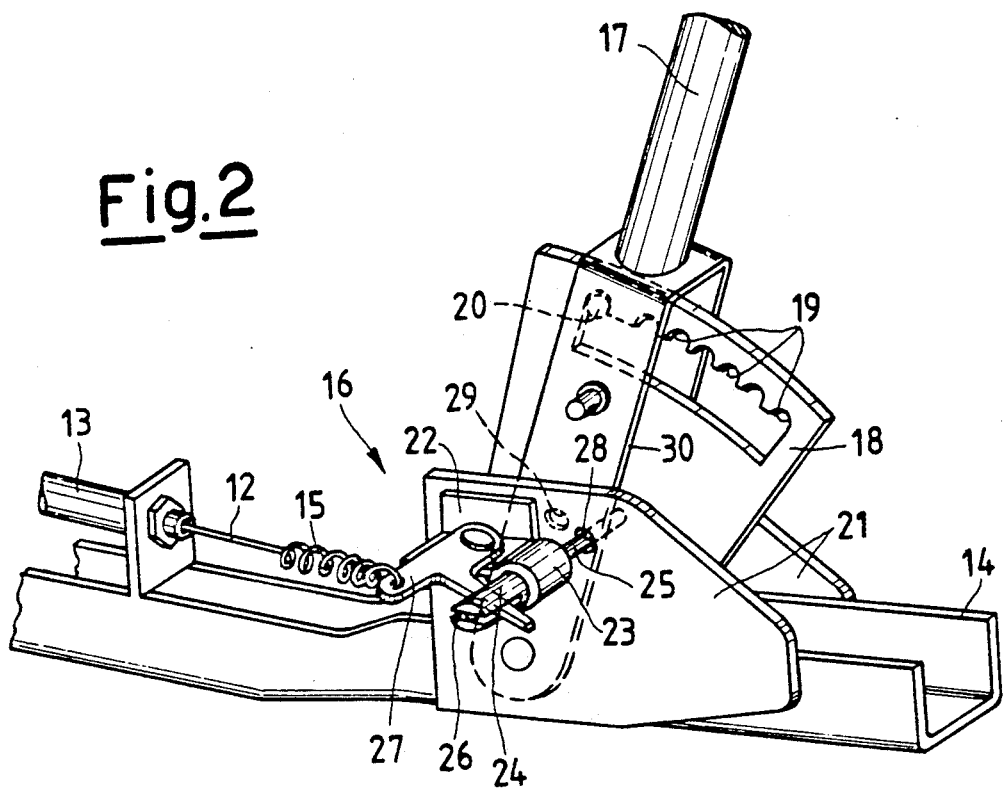
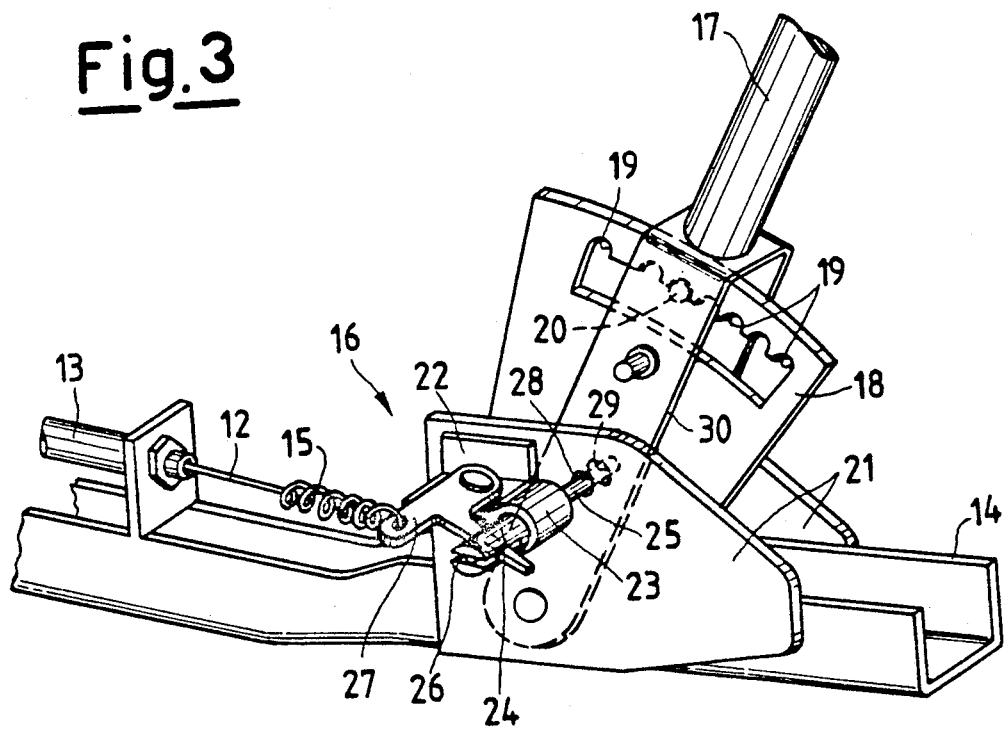

SAFETY DEVICE IN THE CONTROL OF A MOTOR VEHICLE AUTOMATIC TRANSMISSION

This invention relates to a safety device in the control of a motor vehicle automatic transmission.

More particularly, the invention relates to a safety device which prevents the reverse gear or forward gears being accidentally engaged when the gear selector lever is in its neutral or park position.

Safety devices in the control of automatic tranmissions are known which use an electrical contact operable by the brake pedal and connected to an electromagnetic actuator by an electric cable. The electromagnetic actuator is provided with a locking element which engages in appropriate seats provied in the gear selector lever.

These safety devices, which necessarily have to be connected to the vehicle electrical system, are consequently affected by the partial or total faults which the electrical system can develop, and moreover because of the nature of the electromagnetic actuator they are rather noisy when they engage.

An object of the present invention is to provide a completely mechanical safety device for the selector lever of an automatic transmission which provides good reliability and is also constructionally simple and of low cost.

A further object of the present invention is to provide a device which is entirely housed within the vehicle passenger compartment independently of the position of the gearbox, which can for example be either in the engine compartment or under the vehicle body.

These objects are attained according to the present invention by a safety device in the control of an automatic transmission for a motor vehicle provided with a brake pedal and a lever in mobile engagement with a flange provided with longitudinally aligned selector, the lever operating an automatic transmission and being pivoted to a rigid element, characterised in that to the side of the rigid element there is provided a plate on which by means of a support there is fixed a device for locking the positions of the lever, the device being operable by a cable connected to the brake pedal, there being also provided a first through hole in the plate and a second hole in the lever. Again according to the present invention the device for looking the position of the lever consists of a cylinder rigid with the support and provided with an elastically slidable piston, the piston extending to the outside of the cylinder by way of a pin-shaped end, and also by way of its other end which carries a seat for housing a rotatable arm which is pivoted on the support and connected to the cable which is connected to the brake pedal, the pin-shaped end being engageable with the first hole, and with the second hole or with a side of the lever.

The technical characteristics and further advantages of the present invention will be more apparent from the non-limiting description thereof given hereinafter with reference to the accompanying drawings in which:

FIG. 2 is a perspective view of an enlarged detail of FIG. 1; and

FIG. 3 is a perspective view of an enlarged detail of FIG. 1 with the components shown in a different operating position.

Figure 1:
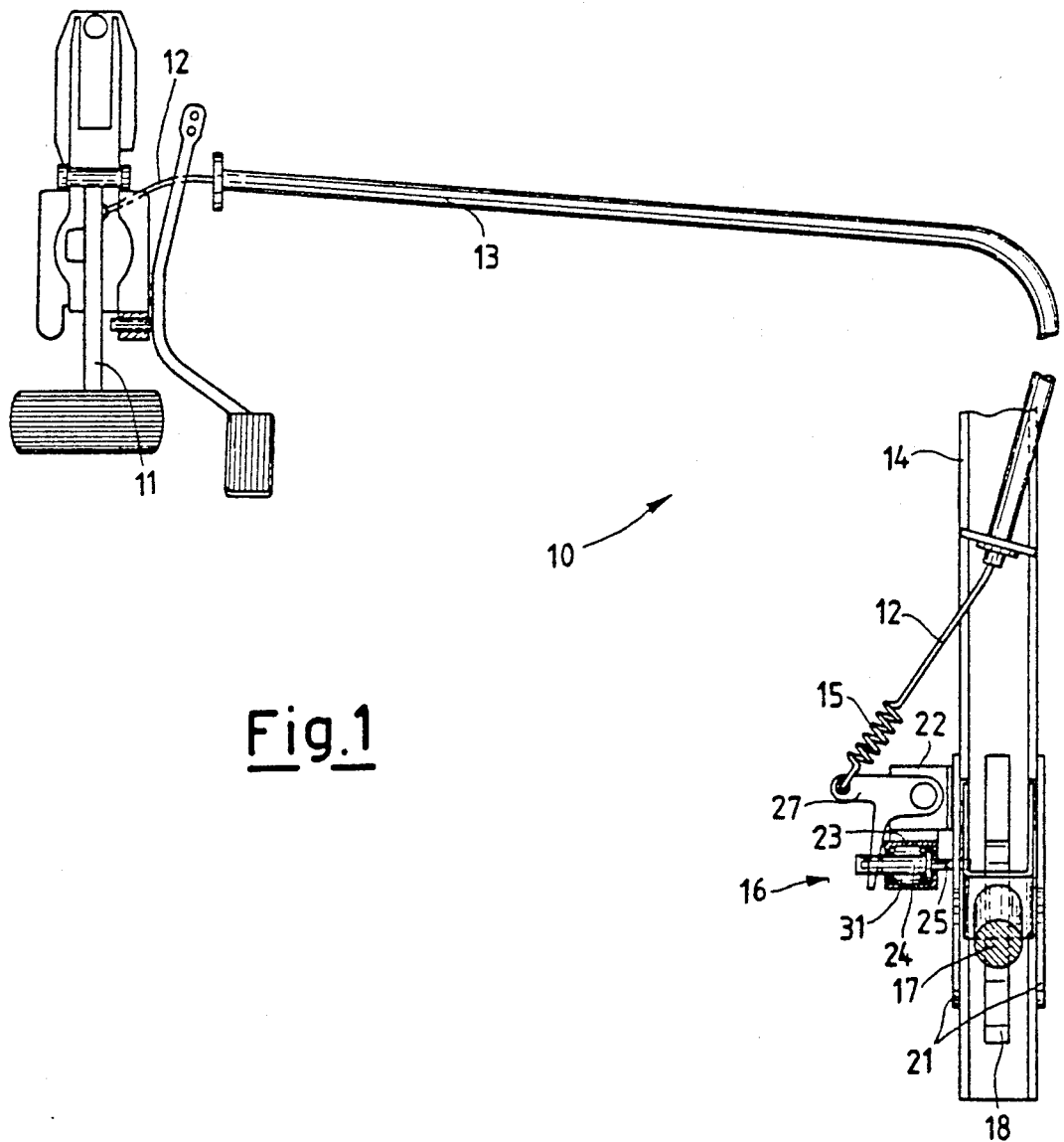
FIG. 1 is a partially plan view of a device according to the present invention.

In the figures the reference numeral 10 indicates overall a device according to the present invention which, in a preferred embodiment, is totally housed in the interior of the passenger compartment of a motor vehicle (not shown).

The reference numeral 11 indicates a brake pedal to which there is connected a cable 12 which by way of a guide 13 extends to a rigid element 14. The cable 12 terminates with a spring 15 fixed to a locking device 16 for the selector lever 17 of a motor vehicle automatic transmission (not shown). The lever 17, pivoted to the rigid element 14, is engaged with a flange 18 also fixed to the element 14 and provided with selectors 19 positioned longitudinally. The lever 17 is also provided with pawl 20 for engaging the selectors 19.

To the sides of the rigid element 14 in positions corresponding with the lever 17 there are fixed plates 21, one of which carries the locking device 16 by means of a support 22.

The locking device consists of a cylinder 23 rigid with the support 22 and provided with a piston 24 elastically slidable within its interior. The piston 24 extends to the outside of the cylinder by way of a pin-shaped end 25 and also by way of its other end, which carries a seat 26 for housing a rotatable arm 27 pivoted on the support 22 and connected to the cable 12.

The pin-shaped end 24 is therefore slidingly engageable with a first hole 28 provided through the plate 21 and either with a second hole 29 provided through the lever 17 or with a side 30 of this latter From the sectional view of the cylinder 23 (FIG. 1) it can be seen that the piston 24 is urged towards the hole 28 and towards the hole 29 or side 30 by the action of a spring 31. The safety device of the present invention is therefore totally mechanical and is operable by pressing the brake pedal 11, which pulls the cable 12, to thus move the rotatable arm 27. This latter, being connected to the seat 26 of the piston 24, causes the pistom to side within the cylinder 23 against the opposing thrust action of the spring 31.

As can be seen from FIG. 2, when the lever 17 is in the park position, ie with the pawl 20 engaged in the first of the selectors 19, the pin 25 of the locking device 16 is in contact with the side 30 of the lever 17. To release the lever 17 it is necessary only to push the brake pedal to move the pin 25 and thus release the lever, which can then be moved into one of the gear engagement positions or into neutral.

A further safety aspect of the present invention is that is also provides locking when the lever 17 is in the neutral position. In this position, shown in FIG. 3, the hole 29 in the lever 17 corresponds with the hole 28 in the plate 21, so enabling the pin 25 to penetrate and lock the lever, to thus prevent a forward or reverse gear being engaged without firstly pressing the brake pedal.

I claim:

1. A safety device for automatically locking a transmission control device in a selected position, said safety device comprising a mounting bracket, a gear selector lever pivotally carried by said mounting bracket for movement in a plane, selector means carried by said lever and said mounting bracket for maintaining said lever in one of a plurality of positions including a "PARK" position, said mounting bracket including an upstanding plate disposed generally parallel to said plane and immediately adjacent a path of a portion of said lever, openings in said plate and said lever portion which are aligned only when said lever is in said "PARK" position, a spring loaded pin carried by said plate in axial alignment with said plate opening and automatically movable into said openings to lock said lever against movement when said lever is in said "PARK" position, and brake pedal control release means for holding said pin in a retracted inoperative position when an associated brake pedal is depressed.

2. A safety device according to claim 1 wherein said release means includes a control lever pivotally mounted on said plate and having first and second arms, brake pedal controlled means attached to said first arm for positioning said control lever, and said second arm being connected to said pin for positioning said pin.

3. A safety device according to claim 2 wherein there is a support carried by said plate, there is a cylinder rigid with said support, a piston slidable in said cylinder with said pin being carried by said piston, and said control lever being mounted on said support with said first arm extending generally parallel to said piston and said second arm extending generally normal to said piston.

4. A safety device according to claim 3 wherein said piston remote from said pin has a slotted seat, and said second arm extends through said seat.

* * * * *